United States Patent
Van De Sluis et al.

(10) Patent No.: US 10,278,263 B2
(45) Date of Patent: Apr. 30, 2019

(54) CONTROLLER FOR A LIGHTING ARRANGEMENT

(71) Applicant: SIGNIFY HOLDING B.V., Eindhoven (NL)

(72) Inventors: Bartel Marinus Van De Sluis, Eindhoven (NL); Berent Willem Meerbeek, Eindhoven (NL); Abraham Antonius Arnoldus Bos, Eindhoven (NL); Roel Peter Geert Cuppen, Eindhoven (NL); Tommy Reinhoudt, Eindhoven (NL); Lieven Verdin, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/741,281

(22) PCT Filed: Jun. 27, 2016

(86) PCT No.: PCT/EP2016/064845
§ 371 (c)(1),
(2) Date: Jan. 1, 2018

(87) PCT Pub. No.: WO2017/009027
PCT Pub. Date: Jan. 19, 2017

(65) Prior Publication Data
US 2018/0184504 A1    Jun. 28, 2018

(30) Foreign Application Priority Data

Jul. 10, 2015 (EP) .................. 15176226

(51) Int. Cl.
*H05B 37/02* (2006.01)
*H05B 33/08* (2006.01)

(52) U.S. Cl.
CPC ..... *H05B 37/0245* (2013.01); *H05B 37/0227* (2013.01); *H05B 37/0272* (2013.01); *H05B 33/0863* (2013.01)

(58) Field of Classification Search
CPC ........... H05B 37/0245; H05B 37/0254; H05B 37/0272; H05B 37/029
(Continued)

(56) References Cited

U.S. PATENT DOCUMENTS 9,554,447 B2 * 1/2017 Rains, Jr. ........... H05B 37/0227
2009/0256483 A1 10/2009 Jackson et al.
(Continued)

FOREIGN PATENT DOCUMENTS

DE     102007025126 A1    12/2008
WO        2010150153 A1    12/2010
(Continued)

*Primary Examiner* — Tung X Le

(57) ABSTRACT

A configurable controller for a lighting arrangement or assembly is adapted to control or change an output characteristic of the lighting arrangement in response to a user input received at a user interface. The configurable controller limits the amount to which a user input at the user interface may adjust the output characteristics by storing a range of selectable or presently available values for the output characteristic. This range of selectable values is adjustable based upon a configuration input received from a remote device at a communication unit.

14 Claims, 8 Drawing Sheets

(58) Field of Classification Search
USPC .......................................... 315/149, 307, 312
See application file for complete search history.

(56) References Cited

U.S. PATENT DOCUMENTS

| | | | |
|---|---|---|---|
| 2013/0063045 A1* | 3/2013 | Ishikita ................ | H05B 33/086 |
| | | | 315/296 |
| 2014/0167620 A1 | 6/2014 | Chobot | |
| 2014/0266600 A1 | 9/2014 | Alberth et al. | |
| 2015/0002276 A1 | 1/2015 | Kicklighter et al. | |
| 2015/0351191 A1* | 12/2015 | Pope .................. | H05B 33/0863 |
| | | | 315/294 |
| 2016/0286616 A1* | 9/2016 | van de Ven ........ | H05B 33/0842 |

FOREIGN PATENT DOCUMENTS

| | | |
|---|---|---|
| WO | 2012168871 A1 | 12/2012 |
| WO | 2014181205 A2 | 11/2014 |

* cited by examiner

CONTROLLER FOR A LIGHTING ARRANGEMENT

CROSS-REFERENCE TO PRIOR APPLICATIONS

This application is the U.S. National Phase application under 35 U.S.C. § 371 of International Application No. PCT/EP2016/064845, filed on Jun. 27, 2016 which claims the benefit of European Patent Application No. 15176226.7, filed on Jul. 10, 2015. These applications are hereby incorporated by reference herein.

FIELD OF THE INVENTION

This invention relates to the field of lighting arrangements, and in particular to controllers for a light arrangement.

BACKGROUND OF THE INVENTION

Lighting arrangements comprising at least one light emitting element are well-known in the prior art. Typical lighting arrangements may have adjustable output characteristics such as: intensity of light; color of light and the number of active light emitting elements.

Typically, to perform adjustment of such output characteristics, a controller for the lighting arrangement may be provided. A user may interact with the controller to choose a desired value of a specific output characteristic. It is well known for such controllers to be provided with user interfaces to allow for this user interaction.

Exemplary user interfaces are known to comprise touch-sensitive or mechanical input devices. One simple example of such a known controller is a dimmer switch, having a rotatable knob for directly controlling the intensity of a lighting arrangement. In at least one other known embodiment, a user may interact with a touch-sensitive display so as to control the color and/or intensity of a lighting arrangement.

SUMMARY OF THE INVENTION

The invention is defined by the claims.

According to a first aspect of the invention, there is provided a configurable controller for a lighting arrangement having one or more light emitting elements, the configurable controller comprising: a communication unit adapted to receive a configuration input from a remote device; a user interface arrangement comprising a touch sensitive area adapted to receive a user input for controlling the lighting arrangement; and a processing unit. The processing unit is adapted to map a range of selectable values of an output characteristic of the lighting arrangement to the touch sensitive area based on the received configuration input and further based on at least one characteristic of the touch sensitive area. The processing unit is further adapted to control the lighting arrangement based on the received user input according to the mapped range of selectable values.

The processing unit can, as an example, store a range of selectable values for an output characteristic of the lighting arrangement, wherein the range of selectable values is a subset of all possible values for the output characteristic of the lighting arrangement. It will then modify the range of selectable values based on the configuration input from the remote device and further based on at least one characteristic of the touch sensitive area. Further, it will modify the output characteristic of the lighting arrangement (i.e. control the lighting arrangement) based on the user input and the modified range of selectable values. This causes the interpretation of the user input (i.e. a touch input using the touch sensitive area) to be based on the stored range of selectable values (i.e. the mapped values).

The configuration input is indicative of a desired configuration of the user interface arrangement. As an example, it comprises a range of selectable values of an output characteristic of the lighting arrangement.

In other words, a lighting arrangement may be controlled by a processing unit of a configurable controller. The processing unit is adapted to only allow an output characteristic of the lighting arrangement to be varied within a range of selectable values. Control and/or change of the output characteristic (within the range of selectable values) is performed in response to a user input at a user interface arrangement. The range of selectable values for the output characteristic may be configured or changed in response to a configuration input received at a communication unit of the configurable controller. In this way, the controller is reconfigurable, so a given input provided to the user interface arrangement maps to different input commands, depending on the configuration of the controller. In particular, the range of values which can be selected by the user using the user interface is not fixed but instead depends on the configuration.

Offering only a limited range or subset of selectable values for a user to control (via the user interface arrangement) advantageously simplifies the control mechanism for a user. Furthermore, a plurality of such lighting arrangements, each providing a subset of user-selectable values in this manner may ensure, for example, that consistent mood/ambient lighting is provided across a wide area (e.g. a restaurant or a home) whilst maintaining a degree of user choice.

Provision of only a limited range of selectable values may allow an improved control over the output characteristic as, for example, more precise values for the output characteristic may be provided. For example, if a user interface arrangement can only provide a discrete number of values, the same number of values may be spread over a smaller range.

Examples of a characteristic of the touch sensitive are: a dimension of the area (e.g. width and/or length), a two-dimensional shape of the area (e.g. circular, square), a three dimensional shape of the area (e.g. oblong), a resolution of the area (i.e. the density or layout of individually detectable touch inputs) or a combination of any of these.

The output characteristic of the lighting arrangement typically consists of one of the following: the intensity of light output by at least one light emitting element; the color of light output by at least one light emitting element; the color temperature of light output by at least one light emitting element; the angle of light emitted by at least one light emitting element; the color saturation of light output by at least one light emitting element; the angle of light emitted by at least one light emitting element; the width of a light beam emitted by at least one light emitting element; the distribution of light emitted by at least one light emitting element; the shape of light emitting by at least one light emitting element; the number of light emitting elements emitting light; the speed of change between any other output characteristic of the lighting arrangement.

In some embodiments, limiting the intensity of light output by at least one light emitting element to be only within a subset or selectable range of values allows a reduced energy expenditure to be ensured (e.g. less energy is used to power light to a higher intensity).

Limiting the color to only be within a selectable range of colors (e.g. only permitting shades of green) allows, for example, for only aesthetically pleasing combinations of colors to be provided to a user, so as to improve the ambience or appearance of light provided by a controlled lighting arrangement.

The user interface arrangement optionally comprises one or more visual output devices, the one or more visual output devices being adapted to display a visual representation of the range of selectable values for the output characteristic of the lighting arrangement.

A visual output device will advantageously allow a user to visualize the potential available values for an output characteristic. For example, a visual display device may exhibit the possible colors of light that a lighting arrangement may presently be controlled to emit (e.g. varying shades of blue).

In other or further embodiments, the user interface arrangement comprises at least one touch-sensitive area adapted to generate the user input based upon a received touch. In some embodiments, the user interface arrangement alternatively or additionally comprises mechanical input devices, for example, a rotary knob, a sliding switch or a push switch.

Advantageously, the user interface arrangement is a touch-sensitive display, such that a user may see a visual representation of a potential value for an output characteristic (from the range of available values for that output characteristic) and select said potential value so as to generate an appropriate user input that causes a change in the output characteristic of the lighting arrangement.

Such an embodiment advantageously simplifies the user interface arrangement of the configurable controller, thus reducing the overall complexity of a system to a user making it more intuitive.

In at least one embodiment the processing unit is adapted to generate first output data comprising information relating to all possible values for the output characteristics of the lighting arrangement, and the communication unit is adapted to send the first output data to the remote device.

Optionally, the processing unit is adapted to generate second output data comprising information relating to a property of the user interface arrangement, and the communication unit is adapted to send the second output data to the remote device.

In this way, output data may be generated by the processing unit so as to provide to the remote device information about the configurable controller (and in particular, a user interface of the configurable controller) and/or the lighting arrangement.

Generating output data for provision to the remote control in this manner may allow, for example, the remote device to provide configuration of the controller which best matches the design of the controller or the specific type of lighting arrangement. In other words, provision of output data for the remote device allows a remote device to provide a more bespoke or personalized configuration input for a controller and/or its associated lighting arrangement.

There may be provided a lighting system comprising a configurable controller as previously described, and a lighting arrangement having one of more light emitting elements, the lighting arrangement being connected to the configurable controller.

According to a second aspect of the invention, there is provided a remote device for configuring a configurable controller for a lighting arrangement having one or more light emitting elements, the remote device comprising: a processing unit adapted to generate a configuration input; and a communication unit adapted to pass the configuration input to the configurable controller, wherein the configuration input corresponds to information relating to a range of selectable values for an output characteristic of the lighting arrangement.

The communication unit may be adapted to receive first output data from the configurable controller, the first output data corresponding to information relating to all possible values for the outputs characteristics of the lighting arrangement, and the processing unit is adapted to generate the configuration input based on the received output signal.

Optionally, the communication unit of the remote device is further adapted to receive second output data from the configurable controller, the second output data corresponding to information relating to a property of a user interface arrangement of the configurable controller; and the processing unit of the remote device is adapted to generate the configuration input based on the second output data.

In at least one embodiment, the remote device further comprises a user interface arrangement adapted to receive a user selection input, wherein the processing unit is further adapted to generate the input based on the received user selection input.

The user interface arrangement of the remote device may comprise a touch-sensitive display adapted to: generate the user selection input based upon a received touch; and display a selectable plurality of ranges of selectable values for an output characteristic of the lighting arrangement, wherein selecting a range from the selectable plurality of ranges causes the processing unit to generate a configuration input relating to the selected range of selectable values for an output characteristic of the lighting arrangement.

According to a third aspect of the invention, there is provided a method of controlling a lighting arrangement having one or more light emitting elements, the method comprising: storing a range of selectable values for an output characteristic of the lighting arrangement, the range of selectable values being a subset of all possible values for the output characteristics of the lighting arrangement; receiving a configuration input from a remote device; modifying the range of selectable values based on the configuration input; receiving a user input for controlling the lighting arrangement from a user interface arrangement; and modifying the output characteristic of the lighting arrangement based on the user input and the range of selectable values, thereby interpreting the user input based on the stored range of selectable values.

The method may further comprise displaying, at one or more displays, a visual representation of the range of selectable values for the output characteristic of the lighting arrangement.

Optionally, the method comprises generating an output signal; and passing the output signal to the remote device, wherein the output signal comprises information relating to at least one of the following: all possible values for the output characteristics of the lighting arrangement; and a property of the user interface arrangement.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
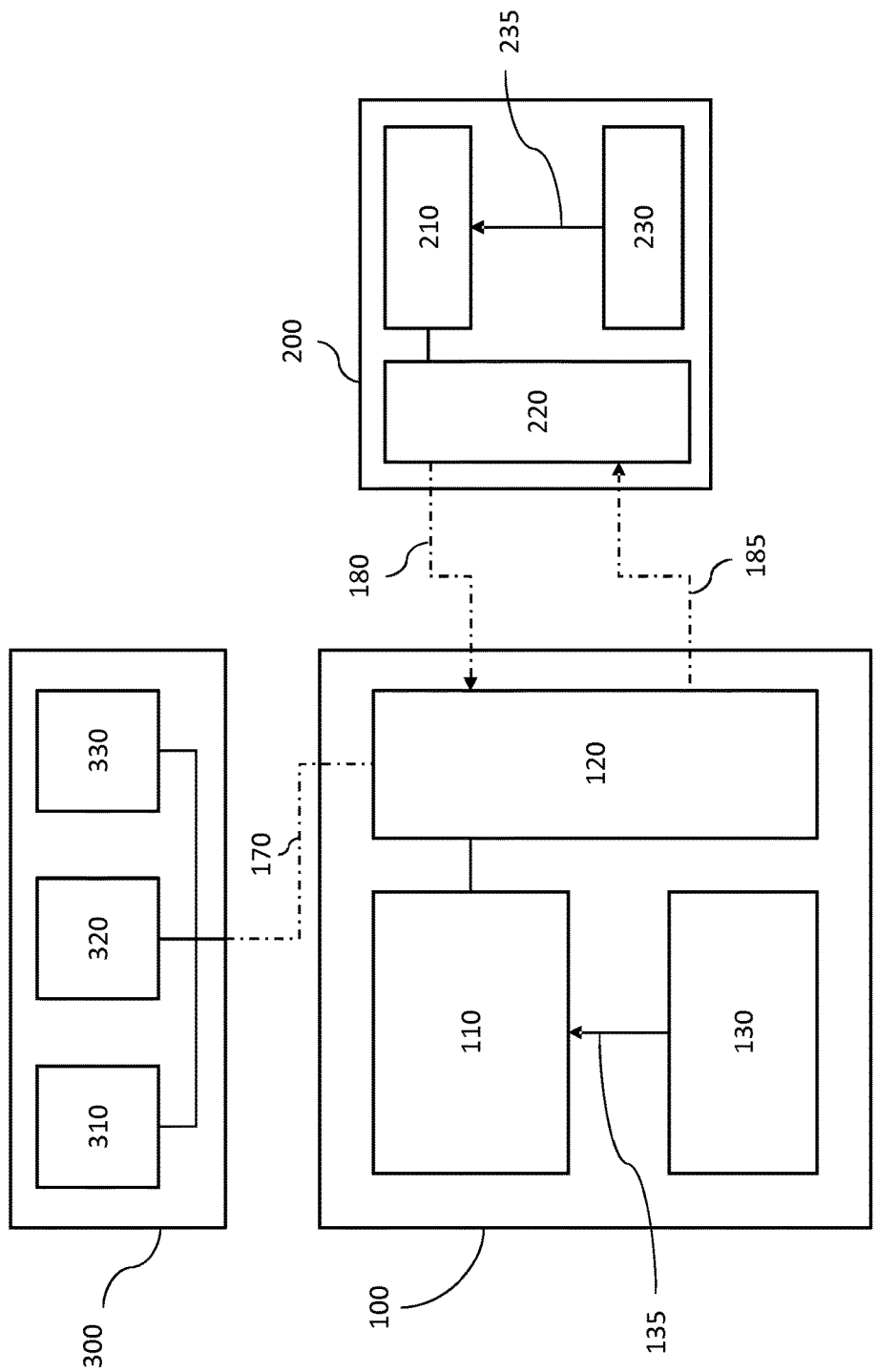
FIG. 1 illustrates a lighting system comprising a configurable controller and a remote device according to a first embodiment of the invention.

The invention provides a configurable controller for a lighting arrangement or assembly. The controller is adapted to control or change an output characteristic of the lighting arrangement in response to a user input received at a user interface. The controller limits the amount to which a user input at the user interface may adjust the output characteristic by storing a range of selectable or presently available values for the output characteristic. This range of selectable values is adjustable based upon a configuration input received from a remote device at a communication unit.

The conceptual structure of a configurable controller 100 and remote device 200 can be readily described with reference to FIG. 1. There is identified in FIG. 1 a configurable controller 100 according to a first embodiment of the invention. The configurable controller comprises a processing unit 110 connected to a communication unit 120 and a user interface arrangement 130.

The configurable controller 100 is adapted to be connectable to a lighting arrangement 300, to control at least one light emitting element of the lighting arrangement. For example, lighting arrangement 300 may comprise a first light emitting element 310, a second light emitting element 320 and a third light emitting element 330. Each light emitting element may, for example, be individually or collectively controllable by the processing unit.

Exemplary light emitting elements may comprise at least one of the following: an LED (light emitting diode); a halogen lamp; a visual display system (e.g. an LED array) or a directable spotlight. Example lighting arrangements may comprise known products, for example, the Philips 'Hue Beyond' luminaries or the Philips 'Living Colors' range.

The controller may be connectable to the lighting arrangement using any known wired or wireless technology. For example, a processing unit may generate a control signal 170 for provision to the lighting arrangement (e.g. via communication unit 120). The lighting arrangement may comprise an additional control element (not shown) adapted to receive the control signal 170, and process the control signal so as to change at least one output characteristic of the lighting arrangement. In alternative or further examples, the configurable controller 100 (e.g. the processing unit 110) is directly connected to lighting elements of the lighting arrangement 300, so as to change an output characteristic of the lighting arrangement (e.g. change a voltage supplied to a lighting element so as to change an intensity of light output by the lighting element). Other methods of controlling an output characteristic of a lighting arrangement are well known to the skilled person.

Suitable wireless communication protocols that may be used to communicate with the lighting arrangement include an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

The user interface arrangement 130 is adapted to receive a user input 135 for transmittal to the processing unit 110. The user interface arrangement may receive the user 135 input at, for example, one or more touch-sensitive areas and/or one or more mechanical input devices (e.g. a rotatable knob or a sliding switch).

The processing unit 110 is adapted to control at least one output characteristic of the lighting arrangement in response to a user input received at the user interface arrangement. In other words, the processing unit may alter at least one output characteristic of the lighting arrangement upon receiving a user input.

By way of example only, the one or more output characteristics of the lighting arrangement controllable by the processing unit may comprise at least one of the following: the number of light emitting element emitting light; the angle of light output by one or more light emitting elements; the intensity of light output by one or more light emitting element; the color of light output by one or more light emitting elements; the profile of light output by at least one light emitting element; the angular spread of light output by at least one light emitting element and/or the color temperature of light output by one or more light emitting elements.

Each output characteristic may be associated with a current value (i.e. a value indicative of the present light output, for example, the present number of light emitting elements emitting light).

There may be a respective range of selectable values stored by the processing unit for at least one such controllable output characteristic, where the range of selectable values is a subset or a selection of all possible values for that output characteristic. The range of selectable values may be a range of presently allowable or permissible values for the output characteristic, such that at any point in time, the output characteristic may only be a value within the range of selectable values.

In other words, the amount to which an output characteristic may be altered by the processing unit in response to a user input may be limited, such that there may be a predetermined maximum and minimum allowable value for an output characteristic.

By way of example only, it may be possible for an angle of light output by a first light emitting element 310 of the lighting arrangement to be changed between 0° and 180°. However, there may be stored in the processing unit a range of selectable values for the angle of light output by the light emitting element (e.g. 45°-90°) such that, in response to any user input at the user interface arrangement, the angle of light output by the first light emitting element may only be changed to an angle within this range (e.g. may only be changed to an angle between 45° and 90°).

It will be readily apparent, therefore, that an output characteristic of a light emitting arrangement (e.g. angle direction of light output by the first light emitting element or intensity of a first light emitting element) may have a range of selectable values. The present value for the output characteristic within this range of selectable values (e.g. the present intensity of light output by the first light emitting element) is determined by a user input received by a user interface of the controller.

The processing unit may store such a range of selectable values, for example, in a memory unit (not shown).

Thus, the configurable controller may be thought to at least partially control at least one light emitting element and/or the lighting arrangement.

The communication unit 120 is adapted to receive a configuration input 180 from a remote device 200. The communication unit may be adapted to receive such a configuration input using at least one known data format via, for example, via a wireless communication method or a direct wired connection. Examples of suitable wireless communication protocols have been previously described.

The processing unit 110 is adapted to reconfigure or change a range of selectable values for an output characteristic based upon such a received configuration input.

The conceptual structure of a remote device 200 is also shown in FIG. 1. Remote device 200 comprises a processing unit 210, a communication unit 220 and a user interface arrangement 230. The processing unit may be thought to generate the configuration input 180 received by the configurable controller 100.

The configuration input 180 is passed to the configurable controller 100 via a communication unit 220. The communication unit 220 of the remote device may communicate with a communication unit 120 of the configurable controller in any known data transmitting format, for example, via a WiFi network bridge, via Bluetooth or via a direct wired connection. Other formats for transmittal of data between two communications units are well known in the prior art, for example, as those previously described.

The configuration input 180, generated by the processing unit 210 of the remote device 200, comprises data associated with information relating to a desired range of selectable values for an output characteristic of the light arrangement 300. For example, a configuration input may comprise data identifying a maximum and minimum value for a specific output characteristic (e.g. second minimum value 422 for the intensity of the first light emitting element 310 and second maximum value 424 for the intensity of the first light emitting element 310).

The configuration input 180 may be generated by the processing unit 210 of the remote device 200 based on at least a user selection input 235 received from a user interface arrangement 230 of the remote device 200. For example, a user may be able to input a desired maximum and minimum value (i.e. a range) of a specific output characteristic of the lighting arrangement 300 at the user interface arrangement of the remote device, such that the configuration input comprises data relating to this desired range.

The user interface arrangement 230 of the remote device 200 preferably comprises a visual output display for displaying data to a user of the remote device. Even more preferably, the visual output display is a touch-sensitive visual output display or touch-sensitive display, such that a user may generate a user selection input by touching the touch-sensitive display.

The processing unit 110 of the configurable controller 100 may be adapted to generate output data 185 comprising information about the lighting arrangement, for example, identification of what components the light arrangement comprises and/or light rendering capabilities of the lighting arrangement (e.g. what colors/intensities/angles of light may be potentially output by the lighting arrangement).

The processing unit 110 of the configurable controller 100 may be further adapted to generate further output data 185 comprising information about the user interface arrangement of the configurable controller identifying, for example, a size of the user interface arrangement or the number of touch-sensitive areas of the interface arrangement.

Correspondingly, the remote device 200 may be further adapted to receive such output data 185 (e.g. at the communication unit 185) comprising information about the lighting arrangement, and generate a configuration input based on this information.

The remote device may also be adapted to receive the further output data comprising information about the user interface arrangement of the configurable controller (e.g. knowledge about whether discrete or continuous values are required for display on the user interface arrangement of the configuration controller or whether two dimensional or single dimensional display is available etc.).

In at least one further or alternative embodiment, information about the lighting arrangement may be obtained by, for example, a user selecting the lighting arrangement name or representation from a list displayed on the user interface arrangement of the remote device. Information about the lighting arrangement may be received directly from the lighting arrangement via communication unit 220 or via near-field communication methodologies, or by using image processing software (e.g. from an image obtained via a camera of the remote device) to identify a lighting arrangement. Other methods of recognizing a lighting arrangement using a remote device will be well known to those skilled in the art.

Figure 2:
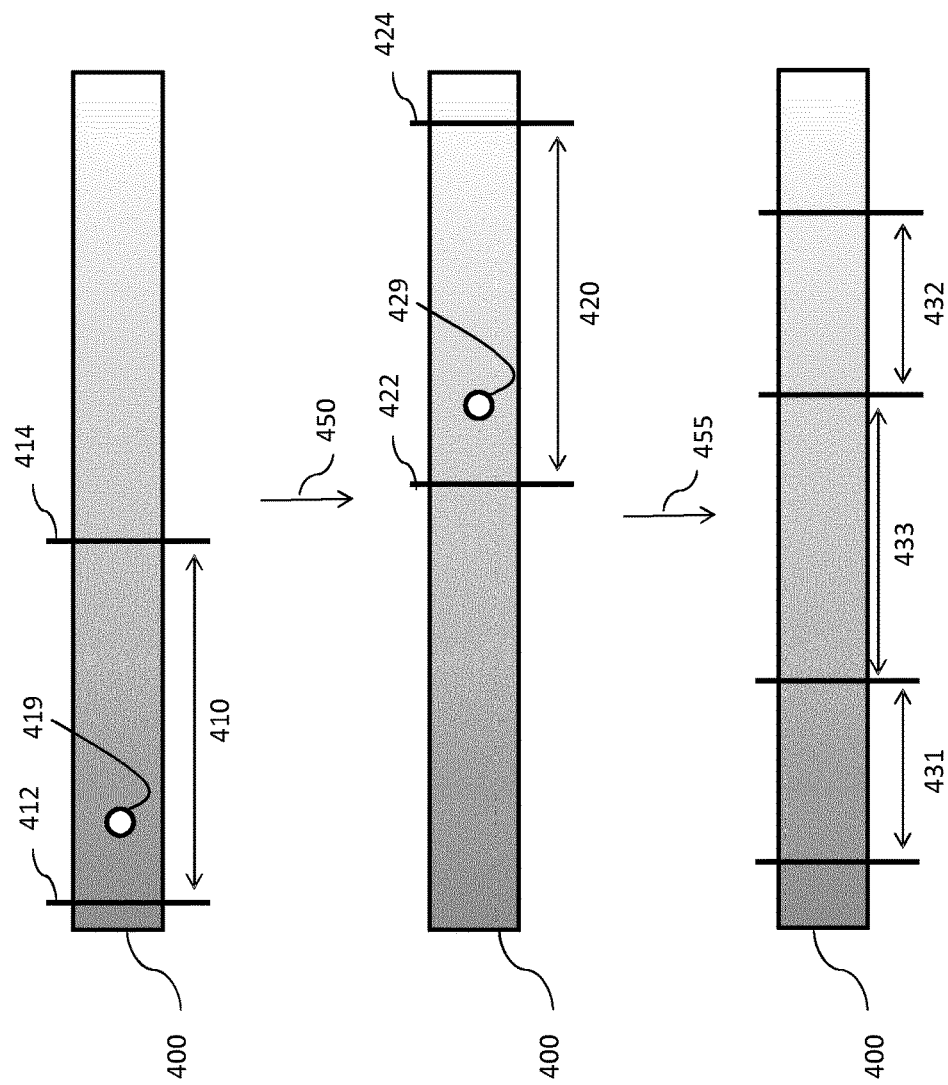
FIG. 2 illustrates a conceptual representation of a process of changing the selectable range of values for a first output characteristic of the lighting arrangement.

The configurability of the configurable controller 100 is explained with reference to FIG. 2, which illustrates a conceptual representation of all possible values 400 for a first output characteristic of the lighting arrangement 300. By way of example, the output characteristic conceptually represented by FIG. 2 is the intensity of light emitted by the first light emitting element 310 of the lighting arrangement 300.

At a first or initial point in time, the configurable controller may be configured so as to only allow the intensity of the first light emitting element 310 to be variable between a first maximum allowable intensity 412 and a first minimum allowable intensity 414. In other words, there is a first range 410 of allowable or selectable values for the intensity of the first light emitting element.

Upon receiving a first configuration input 450, the range of selectable values for the intensity of the first light emitting element is changed, such that at a second point in time the intensity of the first light emitting element 310 is now only variable between a second minimum allowable intensity 422 and a second maximum allowable intensity 424. Thus there may be a second range 420 of allowable or selectable values for the intensity of the first light emitting element.

Accordingly, the range of a given output characteristic may be reconfigured in response to a configuration input received by the communication unit of the controller. Such a configuration input may, for example, be data comprising information relating to a new desired range of selectable output characteristics.

Upon changing the range of selectable values for an output characteristic of the lighting arrangement, the present value for output characteristic may, for example, remain the same until a user input is received (e.g. the present value for an output characteristic may remain outside the selectable range of the output characteristic until a further user input is received).

In other embodiments, the present value for an output characteristic may change dependent upon the relative position of the value for the output characteristic in the ranges of output characteristics. By way of example, if at the first point in time, a value of the intensity of the first light emitting element is a first value 419 of all possible values for the intensity, then at a second point in time (when the selectable range of intensities has changed) the intensity is at a second value 429 of all possible values for the intensity, where the second value 429 is the same relative distance between the second minimum allowable intensity 424 and the second maximum allowable intensity as the first value 419 was between the first minimum allowable intensity 419 and the first maximum allowable intensity 429. In other words, upon changing the range of selectable values for an output characteristic, the present value of that output characteristic is also changed relative to the change in range.

It will be apparent that the range of selectable values need not be wholly continuous, such that there may be a plurality of ranges for which a value of output characteristic may be within. For example, upon receiving a second configuration input 455, the range of selectable values for the intensity of the first light emitting element may be changed, such that, at a third point in time, the intensity of the first light emitting element 310 is variable between within a first range 431 and a second range 432 of values. There may be a discontinuous jump between the first range and the second range (i.e. there may be a range of unallowable or impermissible values 433 for the intensity).

Figure 3:
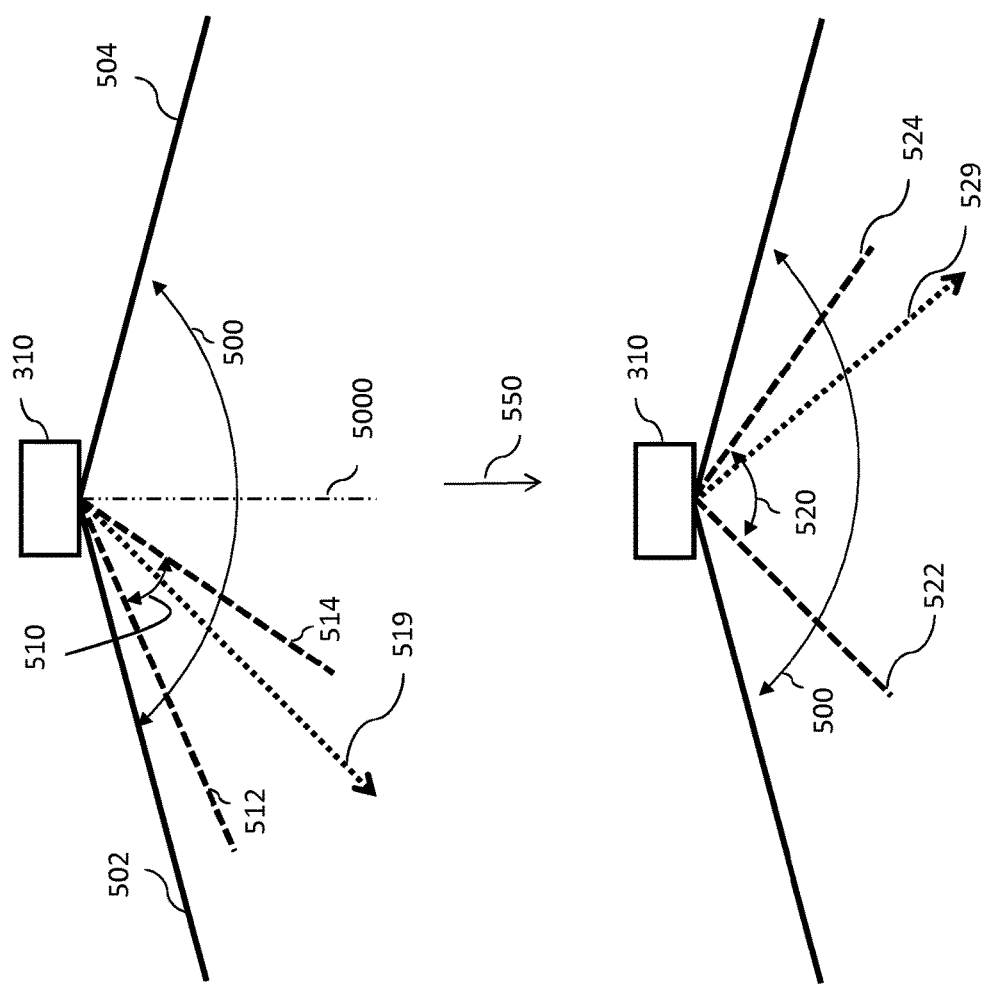
FIG. 3 illustrates a conceptual representation of a process of changing the selectable range of values for a second output characteristic of the lighting arrangement.

By way of a second example, there is identified in FIG. 3 a conceptual representation of a second output characteristic of the lighting arrangement. There is identified a range of all possible values 500 of the angular direction at which light is output in a single axis by the first light emitting element 310. It is apparent that the angular direction at which light is output by the first light emitting element has the potential to be controlled between a minimum possible angle 502 (e.g. −75° to the normal 5000) and a maximum possible angle 504 (e.g. +75° to the normal 5000). Thus there may be a range of all possible values 500 of angular direction in which light may be output by the first light emitting element.

At a first point in time, there may be a first range 510 of selectable or presently available angles at which light may be output by the first light emitting element 310. In other words, the choice of angles to which the processing unit may adjust the angular direction of light output by the first light emitting element is limited, for example, to be between a first maximum value 512 and a second maximum value 514. At this first point in time, the angular direction of light output by the first light emitting element is in a first angular direction 519 (within the first range of selectable values).

Upon receiving a first configuration input 550, the processing unit may change the range of selectable angles at which light may be output by the first light emitting element to a second range 520 of selectable angles. Hence, at a second point in time (after changing the range of selectable angles) the angular direction of light emitted by the first light emitting element may only be changed by the processing unit between a second minimum value 522 and a second maximum value 524. At this second point in time, the angular direction of light output by the first light emitting element is in a second angular direction 529 (within the second range of selectable angles)

It is apparent that each selectable range of values (e.g. first range 510 and second range 520) is a subset of the total possible range of values for the particular output characteristic (e.g. angular direction of light output by the first light emitting element).

It is also apparent that the size of the selectable range of values need not be the same each time (for example, first range 510 is smaller than second range 520).

Figure 5:
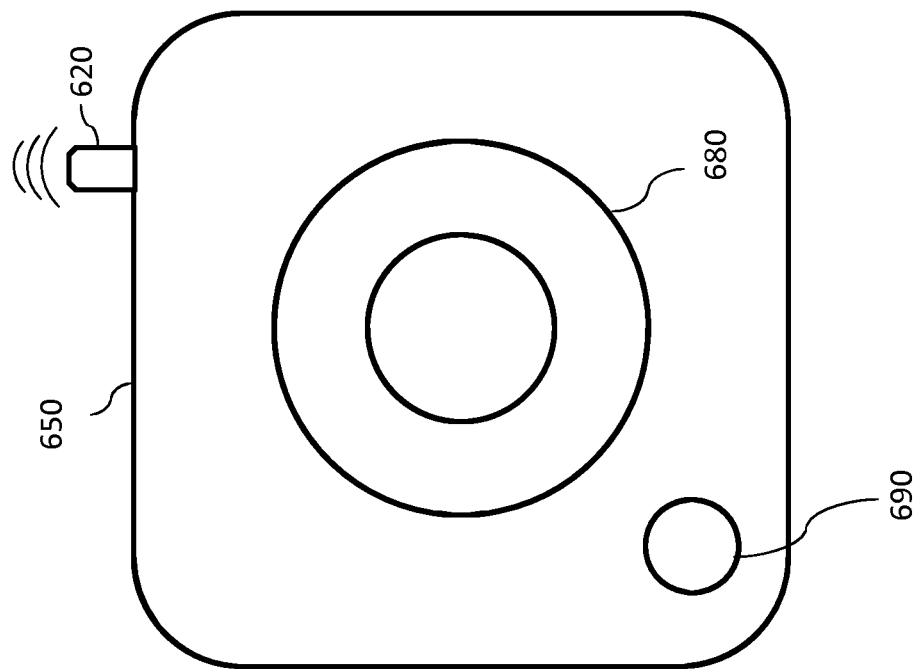
FIG. 5 illustrates a configurable controller according to a second embodiment of the invention.
Figure 4:
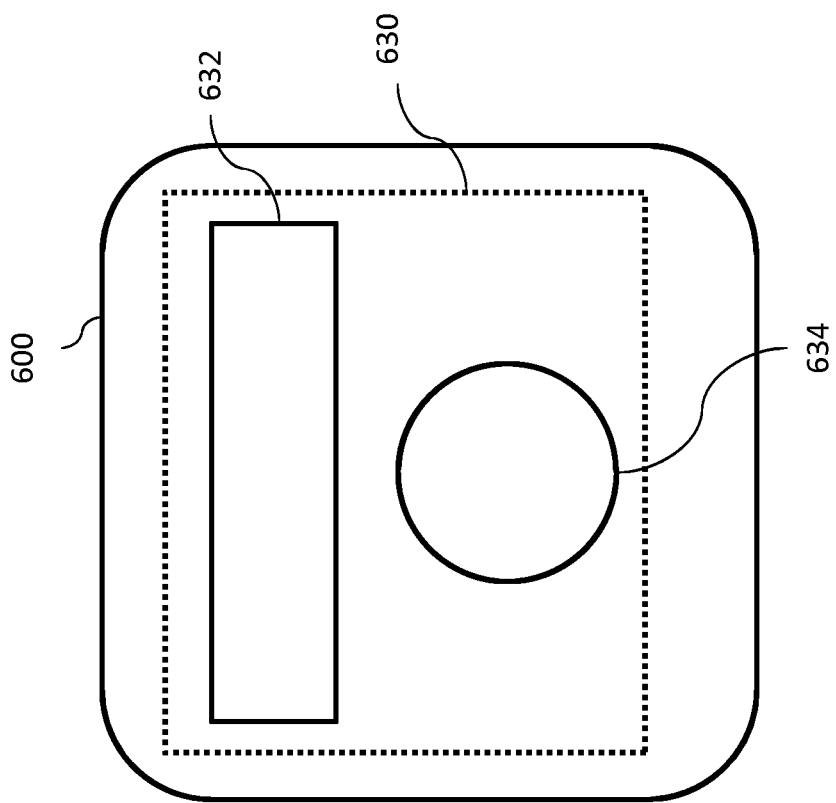
FIG. 4 illustrates a configurable controller according to a first embodiment of the invention.
Figure 6B:
FIGS. 6A-6D each illustrate a respective user interface arrangement of a configurable controller according to embodiments of the invention.
Figure 6D:
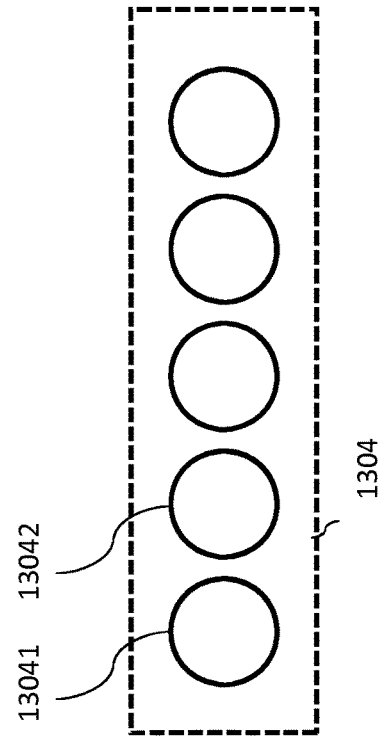
Figure 6A:
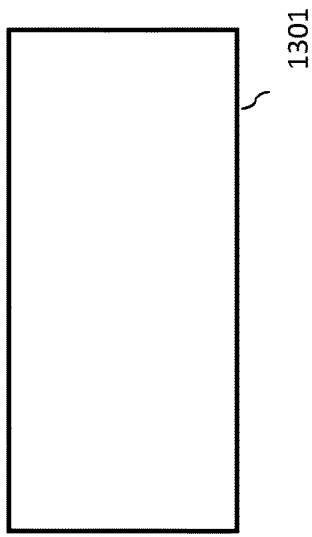
Figure 6C:
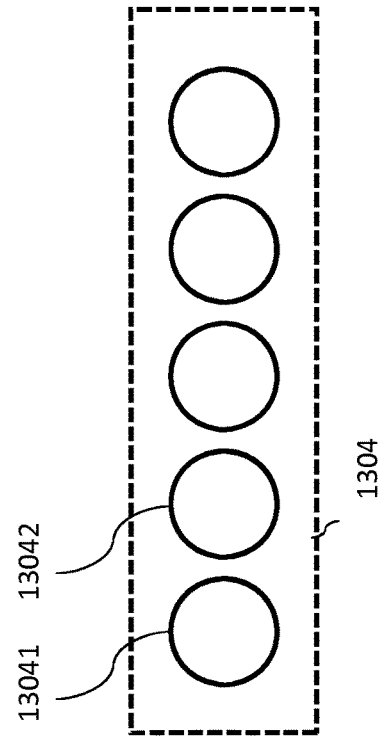

At least one embodiment of a user interface arrangement 120 adapted to receive a user input may be understood with reference to FIGS. 4 and 5.

A first embodiment of a configurable controller 600 comprising a first user interface arrangement 630 is illustrated in FIG. 4. This first user interface arrangement comprises a first visual output device 632 and a user input mechanism 634, presently embodied as a rotatable knob.

A user may rotate the rotatable knob 634 so as to provide a user input for provision to the processing unit 110. Other embodiments may comprise different user input mechanisms (for example, a sliding switch or a push button). Typically, a single user input mechanism respectively controls a single output characteristic of the lighting arrangement (e.g. the rotatable knob 634 may control an intensity of the first light emitting element 310 within a range of selectable values 410).

A plurality of such user input mechanisms 634 may be provided, each associated with a respective output characteristic of the lighting arrangement.

The visual output device 632 may be adapted to visually display a representation of the range of selectable values for a particular output characteristic of the lighting arrangement. By way of example, the visual output device 632 may be an LED display adapted to illustrate the presently available range of intensities (e.g. first range 410) which may controlled by the processing unit 110. Typically the visual output device 632 displays the range of selectable values for the output characteristic associated with the user input mechanism 634.

The visual output device may be further adapted to also display an indication of the present value of the output characteristic of the lighting arrangement. For example, the visual output device may be an LED display adapted to display a line or dot indicating the present intensity of light output by the first light emitting element 310 on a background, the background being the range of selectable intensities of the first light emitting element (e.g. first range 410).

In other embodiments, the visual output device is adapted to only display an indication of the present value of the output characteristic of the light arrangement. By way of example, the visual output device may comprise a plurality of seven-segment displays adapted to display the current angular direction of light output by the first light emitting element 310.

It will be readily apparent that the configurable controller may comprise a plurality of user input mechanisms 634 and/or visual output devices each associated with a respective output characteristic of the lighting arrangement. Thus, each user input mechanism may be thought to at least partially control an output characteristic of at least one light emitting element and/or lighting arrangement.

Illustrated in FIG. 5 is a second embodiment of a configurable controller 650 comprising a second user interface arrangement 680, a communication unit 620 and a processing unit (not shown). The communication unit 620 is embodied as an externally positioned antenna 620, although it will be readily apparent that other aerial or communication systems may be used (e.g. patch antenna, USB connector).

The second user interface arrangement 680 is embodied as a touch-sensitive display, which combines the features and functions of the first visual output device 632 and the user input mechanism 634.

In other words, the second user interface arrangement 680 is a touch-sensitive display, which is adapted to visually display a representation of the range of selectable values for a particular output characteristic of the lighting arrangement 300 and/or an indication of the present value of the said output characteristic as well as being adapted to receive a user input for provision to the processing unit 110 so as to change the said output characteristic of the lighting arrangement 300.

A plurality of such touch-sensitive displays 680 may be provided each associated with a respective output characteristic of the lighting arrangement 300.

The configurable controller 650 may further comprise an override button 690, the override button being adapted to, for example, wholly switch off the light emitting element and/or the lighting arrangement which is partially controlled by the configurable controller 650.

Although the touch-sensitive display is presently embodied formed in an annulus shape, it will be apparent that further alternative embodiments of touch-sensitive displays 680 are possible, such as those identified in FIGS. 6A-6D.

For example, a touch-sensitive display may be embodied as having a first rectangular shape 1301 or a second rectangular shape 1302. A touch-sensitive display having a first rectangular shape 1301 may be associated with output characteristic having a multi-dimensional changing value or a multi-dimensional range (e.g. color, or multiple-axis angular direction). Second rectangular shape 1302 may be associated with output characteristics having a single dimensional range (e.g. intensity of a single light emitting element, single-axis angular direction).

A touch-sensitive display may be embodied to have a circular shape 1303, which may, for example, also be associated with output characteristics having a multi-dimensional range.

In other embodiments, a touch-sensitive display is embodied as having a plurality of individual, touch-sensitive shapes 1304. Each shape may, for example, be adapted to display a specific value within the range of selectable values for the output characteristic associated with the touch-sensitive display. Pressing the specific value may, for example, select this specific value. Thus there may be discrete values within the range of selectable values selectable by a user. By way of example, first individual shape 13041 may be associated with a first color (e.g. dark blue) of the first light emitting element, whereas second individual shape 13042 may be associated with a second color (e.g. a lighter blue) of the first light emitting element.

Figure 7:
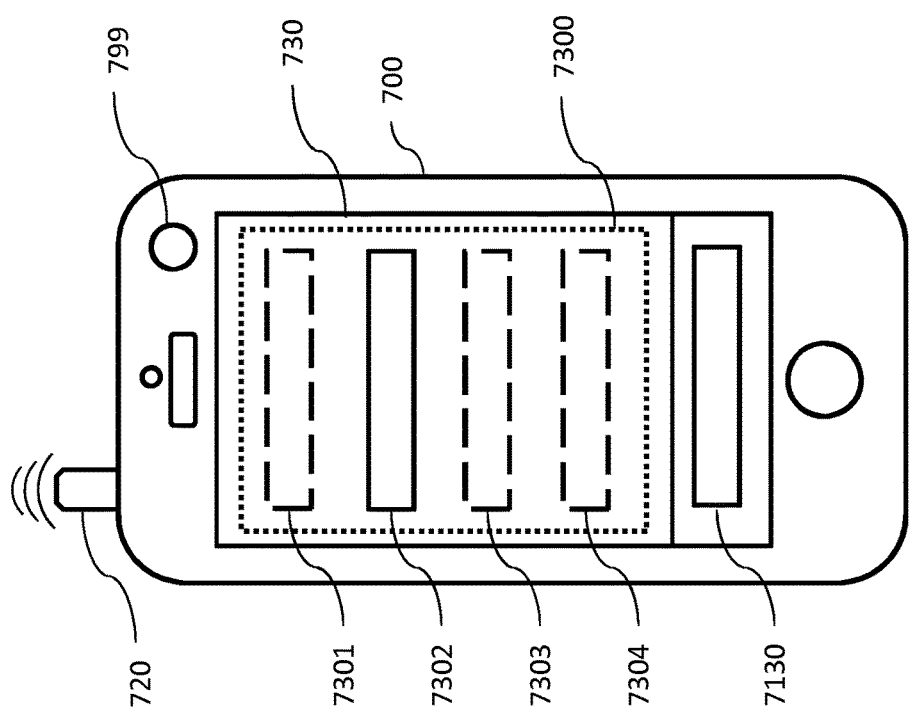
FIG. 7 illustrates a remote device according to a first embodiment of the invention.

A first embodiment of a remote device is explained with reference to FIG. 7, wherein the user interface arrangement of the remote device 700 is embodied as a touch-sensitive display 730. It will be apparent, however, that embodiments of the remote device 700 are not limited thereto. The communication unit 220 may be embodied as an externally positioned antenna 720, although it will be readily apparent that other aerial or communication systems may be used (e.g. patch antenna, USB connector).

The remote device 700 may be adapted to display (to a user) information about the lighting arrangement 300, for example, identifying the light emitting elements of the light arrangement (e.g. a single bulb, an array of LEDs etc.). This information may be displayed by a touch-sensitive display 730 of the remote device 700.

In other or further embodiments, the touch-sensitive display 730 may be adapted to display a visual representation of the user interface arrangement 130 of the configurable controller. Information concerning the user interface arrangement 130 of the configurable controller may be received by the remote device 200, for example, in the output data 185.

As the user interface arrangement 130 of the configurable controller 100 may be adapted to display a visual representation of the range of selectable values for a particular output characteristic of the lighting arrangement, so the touch-sensitive display 730 may be adapted to display a first visual representation 7130 of this same user interface 130 identifying the range of selectable values for a particular output characteristic of the lighting arrangement 300.

By way of example, a user interface arrangement 130 of the configurable controller 100 may be embodied as a touch-sensitive display formed in the second rectangular shape 1302. Such a shaped user interface arrangement may display a representation of the present range of selectable values for a particular output characteristic (e.g. the user interface arrangement 130 may display the first range 410 of allowable or selectable values for the intensity of the first light emitting element). A visual representation of this user interface arrangement 130 of the configurable controller 100 (including the displayed range of selectable values) may be displayed on the touch-sensitive display 730 of the remote controller 700. In other words, the touch-sensitive display may display a first visual representation of the user interface 7130 which identifies a present range of selectable values for a particular output characteristic of the lighting arrangement.

In further embodiments, the touch-sensitive display 730 displays a plurality of further visual representations 7301, 7302, 7303, 7304 of the user interface 130 of the configurable controller 100, each further visual representation being indicative of a potential or possible range of selectable values for the output characteristic of the lighting arrangement. A user may select (i.e. touch the displayed further visual representation) to indicate a desired new range of selectable values for an output characteristic of the lighting arrangement.

It may be understood that these potential or possible range of selectable values constitute a predefined range of selectable values.

By way of example, the touch-sensitive display 730 may be adapted to display a list 7300 comprising at least one visual representation 7301, 7302, 7303, 7304 of a possible range of selectable values for an output characteristic of the lighting arrangement. The visual representation is preferably formed in the same shape as a visual output display 1302 of an associated configurable controller 130. Selecting a visual representation 7302 of a possible range causes the processing unit 210 of the remote device 200 to generate a configuration input 180 based on the selected possible range, which is passed to the configurable controller 100. The processing unit 110 of the configurable controller 100 modifies the range of selectable or presently available values based on this configuration input 180 such that the selected possible range becomes the new range of selectable or presently available values for the output characteristic of the lighting arrangement.

Figure 8:
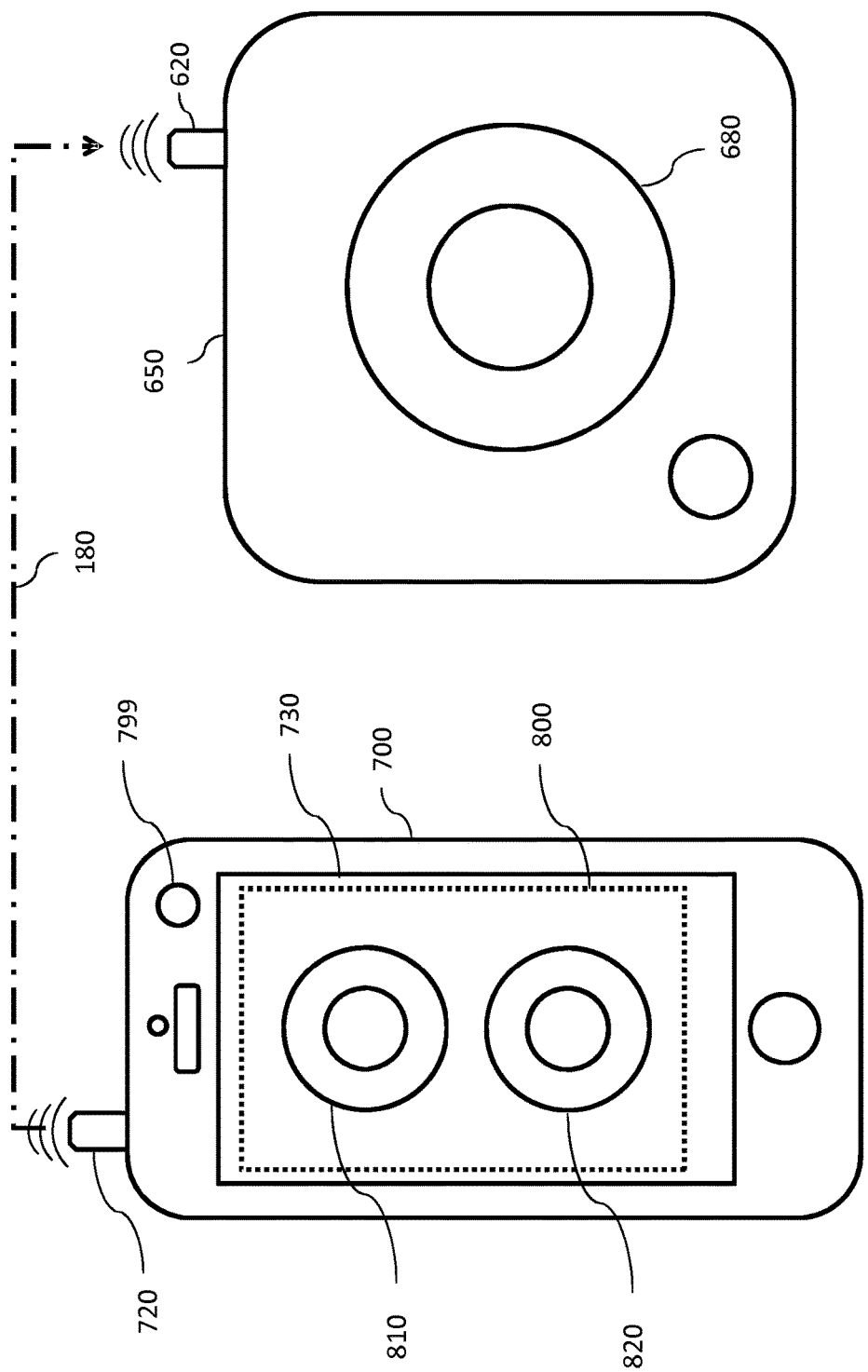
FIG. 8 illustrates a remote device according to a second embodiment of the invention.

Another example is described with reference to FIG. 8, which depicts a configurable controller 650 and a remote device 700. Displayed on a touch-sensitive display of the 730 of the remote device 700 are a plurality 800 of visual representations of the user interface (here embodied as a touch-sensitive display 680) of the configurable controller.

Each visual representation (e.g. first representation 810 and second representation 820) is associated with a different possible range of selectable values for the output characteristic controlled by the configurable controller (e.g. light intensity). Selecting (e.g. touching) one of these visual representations causes the processing unit of the remote device 700 to generate a configuration input signal 180, which is passed to the configurable controller via the communication unit 720 of the remote device and the communication unit of the configurable controller 620 (e.g. via WiFi, Bluetooth, wired connection, 3G etc.). The processing unit of the configurable controller 650 reconfigures the range of selectable values to reflect the chosen or selected possible range.

In at least one preferable embodiment, the output characteristic of the lighting arrangement 300 which the user may adjust (via the user interface arrangement 130 of the configurable controller 100) is the color of light output by the one or more light emitting elements of the lighting arrangement 300. Assuming that the light output by the one or more light emitting element has the potential to be any possible color, the range of selectable values for the output characteristic may accordingly be a select group of colors (e.g. varying shades of green) from a range of all possible colors.

A user may be able to configure the range of selectable values for the color by generating a color map, color chart or color histogram on the remote device for transmittal to the configurable controller (e.g. via configuration input 180). A color map/chart/histogram may be considered to be the range of available values (e.g. colors) for an output characteristic (e.g. color output by the one or more light emitting elements) of the lighting arrangement A color map may, for example, consist of data formatted into a two-dimensional table (e.g. x and y) having a plurality of fields. Each field in the table may comprise data related to specified color (e.g. in a HSL, HSV or RGB format). The position of the field in the table may represent the relative position of a color on a visual display of the user interface arrangement 130 of the configurable controller.

In a remote device according to at least one embodiment, there is a plurality of preset color maps displayed to the user at a visual display device of the user interface arrangement of the remote device (e.g. touch-sensitive display 730). These preset color maps are displayed in the same shape as a visual output device (e.g. touch-sensitive display 680) of a user interface arrangement 110 of the configurable controller 100, such that a user may be able to envisage how the preset color map may appear on the said visual output device. Thus, in generating a color map, the processing unit 210 of the remote device 700 may consider output data 185 received from the configurable controller 100 containing information about the user interface arrangement 130 of the said configurable controller In a remote device according to at least one further or additional embodiment, a user may generate a color map by selecting two or more colors from an array of colors displayed to the user (e.g. on a touch-sensitive display 730). A color map may be generated by the processing unit 210 of the remote device 200 by generating, for example, a gradual gradient between the selected two or more colors such that a plurality of color values may be interpolated from the selected two or more colors.

In a remote device according to at least one further or additional embodiment, a color map may be generated based on at least one image or photograph stored on the device. A processing unit of the remote device may, for example, analyze the image to derive image properties that form the basis for generating a color map.

For example, the processing unit may create an initial color histogram based on a predefined number of colors (e.g. 10 ore more). Such selection of the colors may be achieved, for example, through frequency weighted analysis, median cut, vector quantization, k-mean clustering and/or extreme colors recognition. Other possible image analysis methods for extracting at least one color from an image will be well known to those skilled in the art.

Further colors may be added to the color histogram by interpolating between colors of the initial color histogram (e.g. creating a gradient between different colors).

To provide an image or photograph for such analysis, a user might, for example, take a picture using a camera 799 of the remote device 700, download a picture from an external source (e.g. the internet) or use an already stored image on the remote device.

In generating a color map, the remote device 700 may consider the possible light rendering capabilities of the lighting arrangement 300 (i.e. the possible output characteristics of the lighting arrangement). A color map generated by the remote device may, for example, not include colors which the lighting arrangement is unable to output (e.g. browns or blacks). In one example, such information concerning the light rendering capabilities of the lighting arrangement may contained in output data 185 received from the configurable controller 100.

The number of colors calculated to fill the range can be made dependent on the touch resolution of a touch-sensitive area (e.g. touch-sensitive display 680) of the user interface arrangement 130 of the configurable controller. For example, if a touch-sensitive display of an exemplary configurable controller supports detection of 100 touch positions, the remote device may also calculate a corresponding 100 lighting settings.

In at least one embodiment the remote device 700 comprises an environmental sensor adapted to detect the environmental conditions in the vicinity of the lighting arrangement. Such a remote device may be adapted to, for example, automatically send a configuration input so as to reconfigure the configurable controller when a certain level of ambient light is detected. The remote device may otherwise or additionally detect at least one of the following so as to generate the configuration input: a time; the weather; a temperature; a measure of light; a measurement of humidity; a measurement of atmospheric pressure; and a measurement of altitude.

For example, an environmental sensor of the remote device may be adapted to detect a measure of light, and configure the selectable range of values for an intensity of the lighting arrangement to be: only low intensities when a low level of light is measured at the environmental sensor; and higher intensities when a higher level of light is measured at the environmental sensor.

The remote device may comprise a smartphone, smart watch, personal digital assistant or tablet computer. Also, a remote device may be a head-mountable computing device having at least one display module arranged to be viewed by the wearer of the head-mountable computing device when wearing the device. Embodiments may thus employ conventional and widely-available portable computing devices that are commonly carried or worn by a significant number of people.

Figure 9:
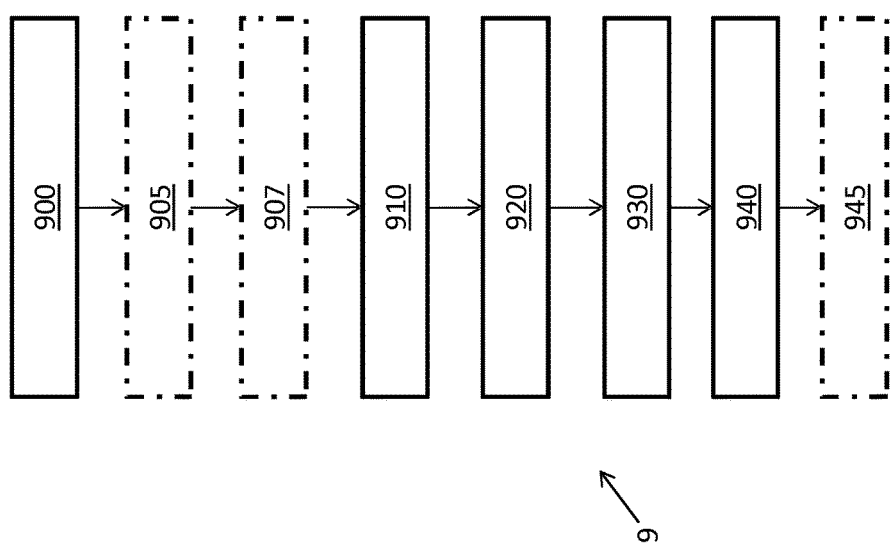

A method 9 of controlling a lighting arrangement having one or more light emitting elements may be described with reference to FIG. 9. The method comprises storing 900 (e.g.

on a processor) a range of selectable values for an output characteristics of the lighting arrangement, the range of selectable values being a subset of all possible values for the output characteristics of the lighting arrangement; receiving 910 a configuration input from a remote device; modifying 920 the range of selectable values based on the configuration input; receiving 930 a user input for controlling the lighting arrangement from a user interface arrangement; and modifying 940 the output characteristic of the lighting arrangement based on the user input and the range of selectable values.

The method 9 optionally further comprises displaying 945 at one or more displays, a visual representation of the range of selectable values for the output characteristic of the lighting arrangement.

In other or further embodiments, the method comprises generating 905 an output signal; and passing 907 the output signal to the remote device, wherein the output signal comprises information relating to at least one of the following: all possible values for the output characteristics of the lighting arrangement; and a property of the user interface arrangement.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A configurable controller for a lighting arrangement having one or more light emitting elements, the configurable controller comprising:
   a user interface arrangement, comprising a touch sensitive area, adapted to receive a user input for controlling the lighting arrangement, and
   a communication unit adapted to receive, from a user via a remote device, a configuration input indicative of a desired configuration of the user interface arrangement; and
   a processing unit,
   wherein the processing unit is adapted to map a range of selectable values of an output characteristic of the lighting arrangement to the touch sensitive area based on the received configuration input and further based on at least one characteristic of the touch sensitive area, and wherein the processing unit is further adapted to control the lighting arrangement based on the received user input according to the mapped range of selectable values,
   wherein the processing unit is adapted to generate second output data comprising information relating to the at least one characteristic of the touch sensitive area,
   wherein the communication unit is adapted to send the second output data to the remote device; and
   wherein the at least one characteristic of the touch sensitive area comprises at least one of:
   dimension, shape and resolution of the touch sensitive area.

2. The configurable controller of claim 1, wherein the output characteristic of the lighting arrangement comprises at least one of the following:

the intensity of light output by at least one light emitting element;
the color of light output by at least one light emitting element;
the color temperature of light output by at least one light emitting element;
the color saturation of light output by at least one light emitting element;
the angle of light emitted by at least one light emitting element;
the number of light emitting elements emitting light;
the width of a light beam emitted by at least one light emitting element;
the distribution of light emitted by at least one light emitting element;
the shape of light emitting by at least one light emitting element; or
the speed of change between any other output characteristic of the lighting arrangement.

3. The configurable controller of claim 1, wherein the user interface arrangement comprises one or more visual output devices, the one or more visual output devices being adapted to display a visual representation of the range of selectable values for the output characteristic of the lighting arrangement.

4. The configurable controller of claim 1, wherein the user interface arrangement comprises multiple touch-sensitive areas adapted to generate the user input based upon a received touch.

5. The configurable controller of claim 1, wherein:
   the processing unit is adapted to generate first output data comprising information relating to all possible values for the output characteristics of the lighting arrangement; and
   the communication unit is adapted to send the first output data to the remote device.

6. A remote device for configuring a configurable controller for a lighting arrangement having one or more light emitting elements, as claimed in claim 1, the remote device comprising:
   a remote device processing unit adapted to generate a configuration input; and
   a remote device communication unit adapted to pass the configuration input to the configurable controller,
   wherein the configuration input corresponds to information relating to a range of selectable values for an output characteristic of the lighting arrangement.

7. The remote device of claim 6, wherein:
   the remote device communication unit is further adapted to receive first output data from the configurable controller, the first output data corresponding to information relating to all possible values for the output characteristic of the lighting arrangement; and
   the remote device processing unit is adapted to generate the configuration input based on the received first output data.

8. The remote device of claim 7, wherein the property of a user interface arrangement of the configurable controller comprises an indication of whether discrete or continuous values are required for display on the user interface arrangement of the configuration controller or an indication of whether two dimensional or single dimensional display is available through the user interface arrangement of the configuration controller.

9. The remote device of claim 6, wherein:
   the remote device communication unit is further adapted to receive second output data from the configurable controller, the second output data corresponding to a property of a user interface arrangement of the configurable controller; and the remote device processing unit is adapted to generate the configuration input based on the second output data.

10. The remote device of claim 6, further comprising a remote device user interface arrangement adapted to provide a user selection input, wherein the remote device processing unit is further adapted to generate the input based on the received user selection input.

11. The remote device of claim 10, wherein the remote device user interface arrangement comprises a touch-sensitive display adapted to:
  generate the user selection input based upon a received touch; and
  display a selectable plurality of ranges of selectable values for an output characteristic of the lighting arrangement,
  wherein selecting a range from the selectable plurality of ranges causes the remote device processing unit to generate the configuration input relating to the selected range of selectable values for an output characteristic of the lighting arrangement.

12. A lighting system comprising:
  a lighting arrangement having one or more light emitting elements;
  a configurable controller according to claim 1; and
  a remote device.

13. A method of controlling a lighting arrangement having one or more light emitting elements, the method comprising:

receiving, by a communication unit, from a user via a remote device, a configuration input indicative of a desired configuration of a user interface arrangement comprising a touch sensitive area, mapping, by a processing unit, a range of selectable values for an output characteristic of the lighting arrangement to the touch sensitive area based on the received configuration input and further based on at least one characteristic of the touch sensitive area, receiving, by the processing unit, a user input for controlling the lighting arrangement from the user interface arrangement, controlling, by the processing unit, the lighting arrangement based on the received user input according to the mapped range of selectable values, generating, by the processing unit, an output signal; and passing, by the communication unit, the output signal to the remote device, wherein the output signal comprises information relating to at least one of the following: all possible values for the output characteristics of the lighting arrangement; and a characteristic of the user interface arrangement, wherein the characteristic of the user interface arrangement comprises at least one of: dimension, shape and resolution of the touch sensitive area.

14. The method of claim 13, further comprising displaying, at one or more displays comprised in the user interface arrangement, a visual representation of the range of selectable values for the output characteristic of the lighting arrangement.

* * * * *